(12) United States Patent
Lim et al.

(10) Patent No.: US 12,094,334 B2
(45) Date of Patent: Sep. 17, 2024

(54) SYSTEM AND METHOD FOR ROAD ALERT SYSTEMS TO IMPROVE IN-CAR SPEECH INTELLIGIBILITY AND REDUCE NOISE POLLUTION

(71) Applicant: HARMAN INTERNATIONAL INDUSTRIES, INCORPORATED, Stamford, CT (US)

(72) Inventors: Joel Chu Ming Lim, Aichi (JP); Cameron Thomas O'Neill, Tokyo-to (JP); Basheer Justin Bazoun, Troy, MI (US)

(73) Assignee: Harman International Industries, Incorporated, Stamford, CT (US)

( * ) Notice: Subject to any disclaimer, the term of this patent is extended or adjusted under 35 U.S.C. 154(b) by 349 days.

(21) Appl. No.: 17/553,246

(22) Filed: Dec. 16, 2021

(65) Prior Publication Data

US 2023/0196911 A1    Jun. 22, 2023

(51) Int. Cl.
*G08G 1/04* (2006.01)
*G08G 1/01* (2006.01)
*H04W 4/44* (2018.01)

(52) U.S. Cl.
CPC ............. *G08G 1/04* (2013.01); *G08G 1/0112* (2013.01); *G08G 1/0116* (2013.01); *G08G 1/0141* (2013.01); *H04W 4/44* (2018.02)

(58) Field of Classification Search
CPC ...... G08G 1/04; G08G 1/0112; G08G 1/0116; G08G 1/0141; H04W 4/44
USPC ............................................................ 701/1
See application file for complete search history.

(56) References Cited

U.S. PATENT DOCUMENTS

| | | | |
|---|---|---|---|
| 11,127,265 B1* | 9/2021 | Kimchi | H04R 1/025 |
| 2014/0056438 A1* | 2/2014 | Baalu | B60Q 5/008 |
| | | | 381/86 |

OTHER PUBLICATIONS

Start, E., "Design of Voice Alarm Systems for Traffic Tunnels: Optimisation of Speech Intelligibility", Jan. 13, 2015, 11 pages.
Van Wijngaarden, S. J. et al., "Prediction of speech intelligibility for public address systems in traffic tunnels", Applied Acoustics, Apr. 1, 2006, 18 pages, Elsevier Publishing, vol. 67, No. 4.
European Search Report dated Apr. 11, 2023 for European Patent Application No. 22209447.6, 9 pages.

\* cited by examiner

*Primary Examiner* — Hunter B Lonsberry
*Assistant Examiner* — Helen Li
(74) *Attorney, Agent, or Firm* — Brooks Kushman P.C.

(57) ABSTRACT

In at least one embodiment, a road alert system is provided. The system includes a loudspeaker array and at least one controller. The loudspeaker array transmits an audio output signal to a vehicle traveling on a road. The at least one controller is programmed to receive a message indicative of a warning for the vehicle for transmission on the audio output signal and to apply equalization parameters to the message to increase in-vehicle speech intelligibility of the audio output signal within the vehicle. The at least one controller is further programmed to transmit the audio output signal via the loudspeaker array in a beamforming mode to minimize noise pollution for objects positioned along the road.

17 Claims, 6 Drawing Sheets

| Sound Source | Noise Pollution @ (50, 100) | Noise Pollution @ (50, 200) |
|---|---|---|
| Folded Horn | 76.3 dBA | 71.4 dBA |
| PointSource | 84.9 dBA | 84.7 dBA |
| JBL Intellivox Without EQ | 57.2 dBA | 57.1 dBA |
| Loudspeaker Array 102 (With EQ and Beamforming) | 68.3 dBA | 68.5 dBA |

*Fig-8*

| Sound Source | In-Car STI Rating | IEC Quality |
|---|---|---|
| Folded Horn | 0.08 | Bad |
| PointSource | 0.64 | Good |
| JBL Intellivox Without EQ | 0.41 | Fair |
| Loudspeaker Array 102 (With EQ and Beamforming) | 0.68 | Good |

*Fig-9*

SYSTEM AND METHOD FOR ROAD ALERT SYSTEMS TO IMPROVE IN-CAR SPEECH INTELLIGIBILITY AND REDUCE NOISE POLLUTION

TECHNICAL FIELD

Aspects disclosed herein generally relate to a system and method for road alert systems. More specifically, aspects disclosed herein relate to a system and method for road alert system to improve in-car speech intelligibility and reduce noise pollution.

BACKGROUND

Any number of loudspeaker arrays may be positioned in front of a tunnel that is configured to generate audible alerts to a vehicle prior to entry of the vehicle into the tunnel. Such loudspeaker arrays may be known as road alert speaker systems. The loudspeaker arrays are configured to provide audible warnings to a driver of the vehicle prior to entry into the tunnel. The audible warning may include a message pertaining to lane closure, command to activate headlights, no passing onto other lanes, etc. Alternatively, some road alert system may provide a repetitive beeping alert to warn the driver of a condition regarding the tunnel. Due to road noise or other factors, these messages or tones may not be heard by the driver. Conventional road alert systems may be unable to perform adequately in both speech intelligibility and noise pollution.

SUMMARY

In at least one embodiment, a road alert system is provided. The system includes a loudspeaker array and at least one controller. The loudspeaker array transmits an audio output signal to a vehicle traveling on a road. The at least one controller is programmed to receive a message indicative of a warning for the vehicle for transmission on the audio output signal and to apply equalization parameters to the message to increase in-vehicle speech intelligibility of the audio output signal within the vehicle. The at least one controller is further programmed to transmit the audio output signal via the loudspeaker array in a beamforming mode to minimize noise pollution for objects positioned along the road.

In at least another embodiment, a method for transmitting an alert to a vehicle on a road is provided. The method includes transmitting, via a loudspeaker array, an audio output signal to a vehicle traveling on the road; and receiving, at at least one controller, a message indicative of a warning for the vehicle for transmission on the audio output signal. The method further includes applying equalization parameters to the message to increase in-vehicle speech intelligibility of the audio output signal within the vehicle; and transmitting the audio output signal via the loudspeaker array in a beamforming mode to minimize noise pollution for objects positioned along the road.

In at least another embodiment, a computer-program product embodied in a non-transitory computer readable medium that is programmed for transmitting an alert to a vehicle on a road is provided. The computer-program product includes instructions for transmitting, via a loudspeaker array, an audio output signal to a vehicle traveling on the road; and for receiving, at at least one controller, a message indicative of a warning for the vehicle for transmission on the audio output signal. The computer-program product includes instructions for applying equalization parameters to the message to increase in-vehicle speech intelligibility of the audio output signal within the vehicle; and transmitting the audio output signal via the loudspeaker array in a beamforming mode to minimize noise pollution for objects positioned about along the road.

BRIEF DESCRIPTION OF THE DRAWINGS

The embodiments of the present disclosure are pointed out with particularity in the appended claims. However, other features of the various embodiments will become more apparent and will be best understood by referring to the following detailed description in conjunction with the accompany drawings in which:

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

It is recognized that the controllers/devices as disclosed herein and in the attached Appendix may include any number of microprocessors, integrated circuits, memory devices (e.g., FLASH, random access memory (RAM), read only memory (ROM), electrically programmable read only memory (EPROM), electrically erasable programmable read only memory (EEPROM), or other suitable variants thereof), and software which co-act with one another to perform operation(s) disclosed herein. In addition, such controllers as disclosed utilizes one or more microprocessors to execute a computer-program that is embodied in a non-transitory computer readable medium that is programmed to perform any number of the functions as disclosed. Further, the controller(s) as provided herein includes a housing and the various number of microprocessors, integrated circuits, and memory devices ((e.g., FLASH, random access memory (RAM), read only memory (ROM), electrically programmable read only memory (EPROM), electrically erasable programmable read only memory (EEPROM)) positioned within the housing. The controller(s) as disclosed also include hardware-based inputs and outputs for receiving and transmitting data, respectively from and to other hardware-based devices as discussed herein.

Conventional road alert loudspeaker systems may be unable to perform adequately in both speech intelligibility and noise pollution. Systems that are able to achieve reasonable in-car speech intelligibility do so at the cost of excessive noise pollution. Conversely, systems that limit noise pollution may not achieve sufficient in-car speech intelligibility to be use usable.

Current implementations of road alert systems may be further limited in a number of ways. For example, extremely high sound pressure level (SPL) output may be needed to achieve reasonable speech intelligibility inside moving vehicles due to transmission loss and in-car noise. In order to achieve this high SPL output, bulky roadside loudspeakers and power amplifiers may be needed. These devices severely compromise portability, energy efficiency, and cost-effectiveness of the system. For example, some speaker arrays that may compromise portability may be nearly 6 m long and includes two units. While in some regards, this may be considered portable, a single person cannot carry such a system.

Without a specialized speaker equalization (EQ), the loudspeaker outputs a plurality of frequencies that may not be essential for speech intelligibility, which further decreases efficiency. Due to limited in-car intelligibility, messages are either repeated or replaced with klaxons which can be jarring.

In addition, conventional road alert systems may provide excessive noise pollution to surrounding areas, typically residential areas, due to lack of sound dispersion control. In enclosed areas such as tunnels and parking structures, uncontrolled dispersion results in excess reverberation, which worsens speech intelligibility and noise pollution. In open areas such as arterial roads, excess frequencies that are present in speech (i.e., but not essential for intelligibility) add to noise pollution in surrounding areas.

The example road alert systems as disclosed herein may generally simultaneously improve in-car speech intelligibility and reduce noise pollution. In addition, by optimizing the output of the loudspeaker for in-car speech intelligibility using the specialized loudspeaker EQ, redundant output may be eliminated. This condition enables the loudspeaker itself to be more efficient. This in turn makes the system more portable, energy efficient, and cost effective. Using a digital signal processor (DSP) based array beamforming in a line array loudspeaker eliminates the need for bulky horns as a mechanism for controlling directivity. This reduces the overall mass and the size of the loudspeaker system, thereby reducing integration complexity and improving portability. This may apply to a system that had a similar SPL inside the vehicle. Most conventional systems aim for a lower volume with the desire that the driver hears the warnings. In enclosed spaces, the array beamforming as set forth herein also reduces unwanted reflections, thereby lowering reverberation time. This effect compounds the improvements to speech intelligibility and noise pollution.

Aspects disclosed herein generally provide a road alert system that employs a specialized speaker tuning implementation. For example, the specialized speaker tuning implementation may include speaker equalization and array beamforming. At least one controller positioned on a loudspeaker array of the road alert system may execute the speaker equalization and array beamforming. The specialized speaker tuning may optimize in-car speech intelligibility for the warning issued to the driver in the vehicle. The array beamforming focuses the audible warning onto a target area and minimizes noise pollution in surrounding areas, such as roadside residential areas.

Figure 1:
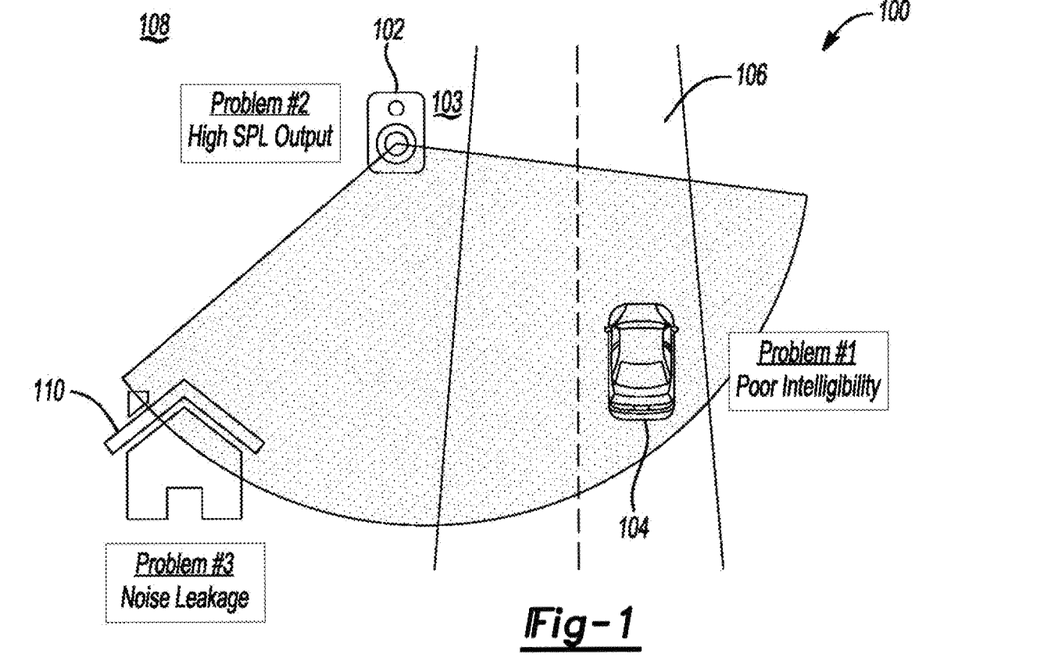
FIG. 1 generally depicts one example of a road alert system.

FIG. 1 generally depicts one example of a road alert system 100. The system 100 generally includes at least one loudspeaker array 102 (or the loudspeaker array 102) and a vehicle 104. As shown, the loudspeaker array 102 may be positioned near a road 106 or another path that enables the vehicle 104 to drive thereon. The loudspeaker array 102 is generally positioned in an outside or exterior open environment 108 with respect to the vehicle 104. The loudspeaker array 102 is programmed to transmit audible warnings to the vehicle 104. The loudspeaker array 102 may receive a recorded message from a server 109 to transmit as the audible warning to the vehicle 104. For example, the loudspeaker array 102 may include any number of transceivers 111 for receiving the recorded message from the server 109. It is also recognized that the loudspeaker array 102 may also directly receive a memory card (not shown) that includes the recorded message for playback or transmission to the vehicle 104.

In one example, the loudspeaker array 102 may be positioned proximate to a tunnel to provide audible warnings or alerts to a driver of the vehicle 104. It is recognized that the loudspeaker array 102 may be positioned in an area of the environment and that the loudspeaker array 102 doesn't necessarily have to be used in connection with transmitting audible warnings to the vehicle 104 for purposes of warning the driver of aspects related to the tunnel. Any warnings may be transmitted for the purpose of simply alerting a drive in the vehicle 104 from any location in the exterior open environment 108 about any road hazard or obstacle that the vehicle 104 may encounter while traveling on the road 106. The loudspeaker array 102 generally includes a plurality of loudspeakers (or speaker elements) 103 arranged therein for transmitting the audible warnings.

The road alert system 100 generally illustrates various problems with respect to some loudspeaker array 102 implementations. For example, the loudspeaker array 102 transmits a wide dispersion of the audio-based warning and that when such a warning reaches the vehicle 104, the audible warning carries poor intelligibility and the driver of the vehicle 104 may not be able to actually hear (or understand) the warning. For example, in this case, the driver may hear a distorted version of the warning and may not be able to discern the meaning over the road noise. In addition, the loudspeaker array 102 transmits the audio warning (or audio output) at a high SPL. This coupled with the high dispersion area leads to noise leakage and disturbs at least one residence and/or at least one commercial business 110.

Figure 2:
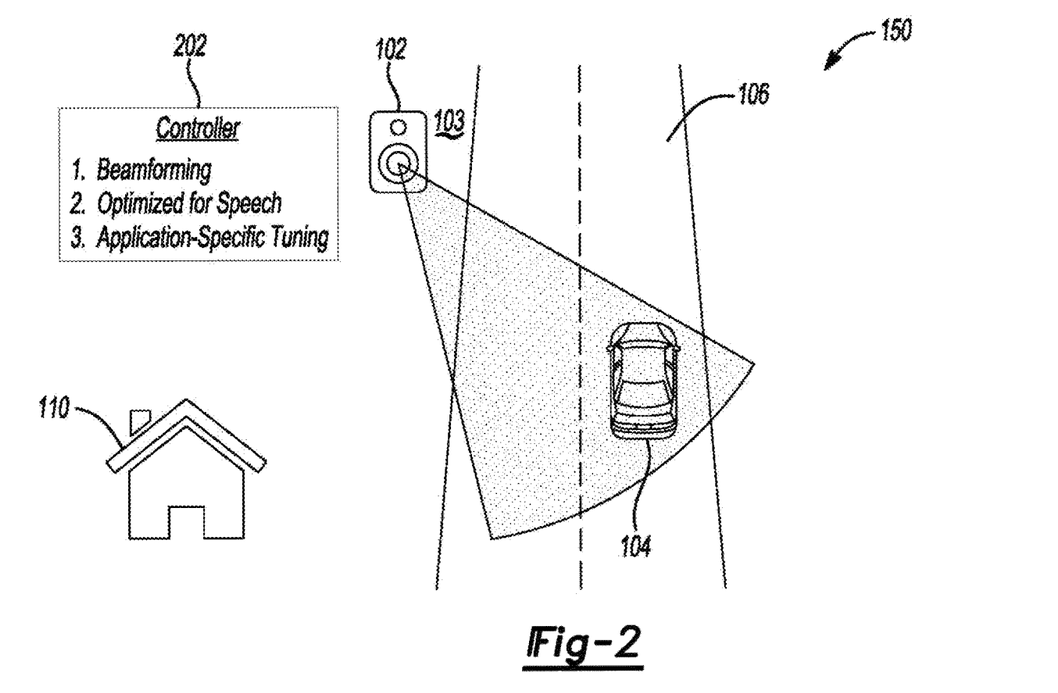
FIG. 2 generally depicts another example of a road alert system that employs beamforming and optimized tuning in accordance with one embodiment.

FIG. 2 generally depicts another example of a road alert system 150 in accordance with one embodiment. In the system 150, the loudspeaker array 102 includes at least one controller 202 (hereafter "the controller 202"). The controller 202 is programmed to perform application specific tuning (or optimized tuning) and beamforming. The controller 202 applies the application specific tuning (or employs loudspeaker equalization) to optimize in-car (or in-vehicle) speech intelligibility for the warning issued to the driver in the vehicle 104. The controller 202 applies the beamforming to reduce the wide dispersion of the audible warning onto a smaller target area that includes the vehicle 104 and minimizes noise pollution in surrounding areas, such as roadside residential areas.

Figure 3:
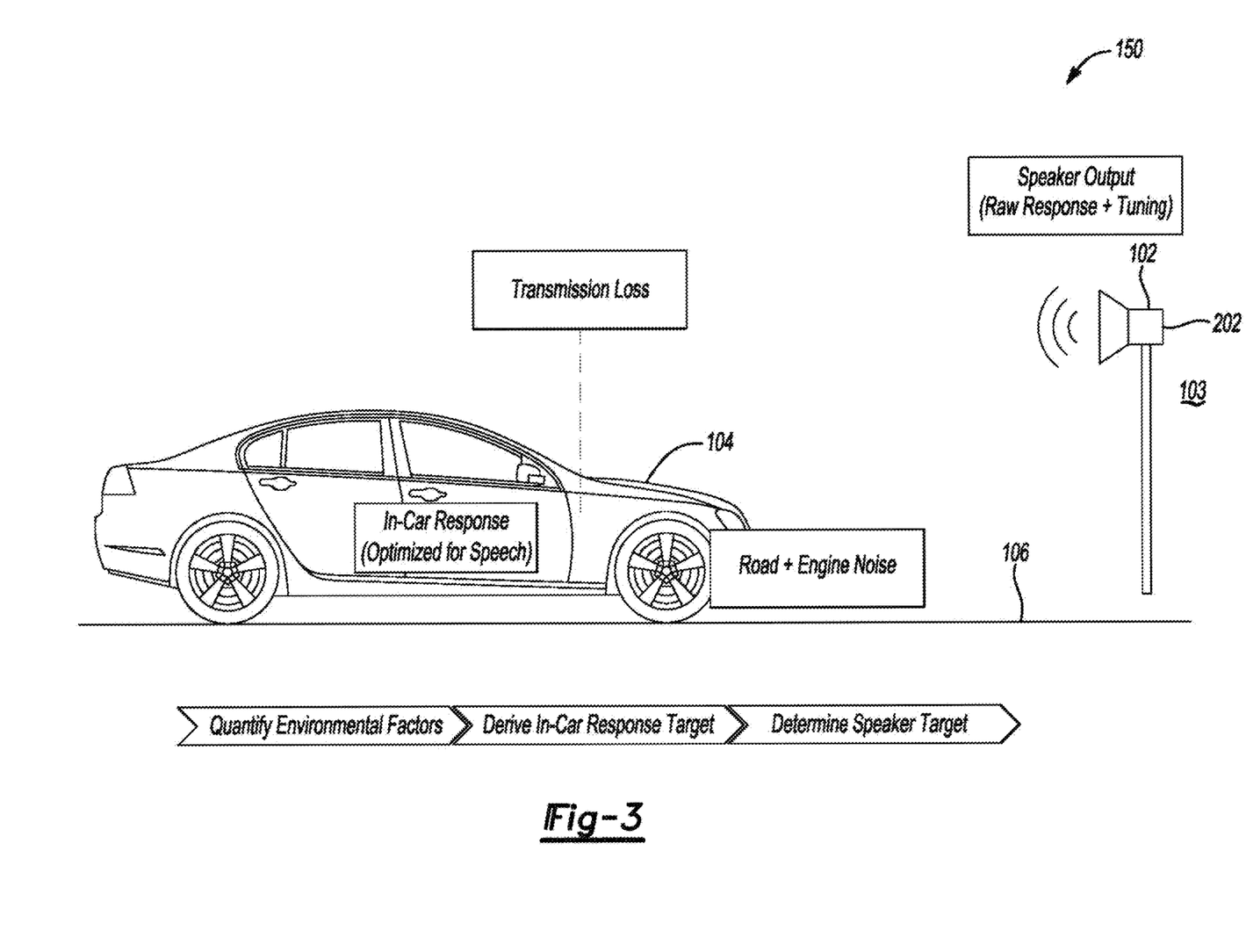
FIG. 3 generally depicts another example of the road alert system in accordance with one embodiment.

FIG. 3 generally depicts another example of the road alert system 150 in accordance with one embodiment. The system 150 as illustrated in FIG. 3 illustrates that the tuned audio as received at the vehicle 104 is optimized for speech (e.g., speech in the vehicle 104 is intelligible) while taking into account transmission loss due to the vehicle itself including sheet metal, glass, etc. and environmental noise such as, but not limited to, road and engine noise that act to otherwise impede or prevent the audible alert from reaching the driver of the vehicle 104. The speaker equalization as performed by the controller 202 enables the in-car speech intelligibility to achieve an in-car (or in-vehicle) Speech Transmission Index (STI) rating of at least 0.6 which generally corresponds to "Good" intelligibility according to the IEC 60268-16 standard.

In general, the equalization parameters employed by the controller 202 is based on measurements performed on a number of different models and makes of vehicles. For example, in-car noise (e.g., road and engine noise) was measured from 10 vehicles of various makes and sizes to achieve an average in-car noise characteristic. Similarly, a transmission loss of vehicles (e.g., due to sheet metal or exterior shell of the vehicle 104) was obtained from measuring 12 vehicles of various makes and sizes to derive an average transmission loss characteristic. Once the in-car noise characteristic and the transmission characteristic are obtained, it is possible to establish tuning parameters (or apply equalization) on the audible output to ensure in-car intelligibility of the audio in the vehicle 104 while taking into account transmission loss and road and engine noise.

Figure 4:
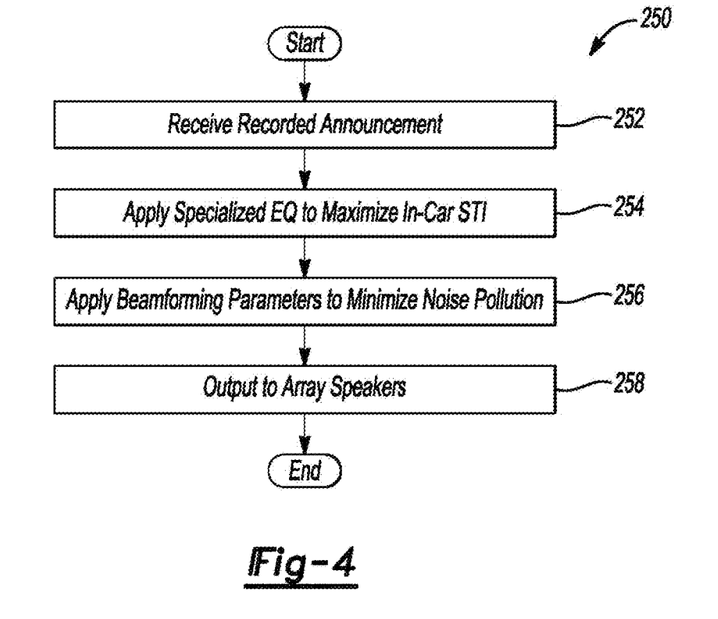
FIG. 4 generally depicts a method for improving in-car speech intelligibility and reducing noise pollution as executed by a loudspeaker array of the road-alert system in accordance with one embodiment.

FIG. 4 generally depicts a method 250 for improving in-car speech intelligibility and reducing noise pollution as executed by controller 202 the loudspeaker array 102 of the road-alert system in accordance with one embodiment.

In operation 252, the loudspeaker array 102 receives a recorded announcement (or audio output to be provided). For example, the loudspeaker array 102 may be wirelessly coupled to the server 109 via a network connection and receive a command from the server 109 to transmit the recorded announcement to any number of vehicles 104 that drive by. As noted above, it is recognized that the loudspeaker array 102 may include any number of transceivers 111 for wirelessly receiving commands from the server. In one example, the transceivers 111 may be used in connection with IEEE 802.3 (e.g., Ethernet), IEEE 802.11 (e.g., WIFI), analog audio signals, Pulse-Code Modulation (PCM) audio, Audio Engineering Society digital audio (e.g., AES3 digital audio, AES10 digital audio, or AES67 packetized digital audio), Dante Multichannel IP Audio, etc.

In operation 254, the controller 202 applies specialized equalization parameters to the audio output based on the measurements obtained vehicle(s) to obtain the average in-car noise characteristic. As noted above, the average in-car noise characteristic takes into account the transmission loss attributed to the vehicle 104 and road and engine noise that may be experienced in the vehicle 104. This aspect increases the in-car intelligibility of the audio output when the audio output enters into a cabin of the vehicle 104.

In operation 256, the controller 202 applies beamforming parameters to minimize noise pollution. As noted above, the controller 202 focuses the dispersion of the audio output onto a smaller target area to reduce noise pollution in the outside or exterior open environment. For example, to perform the beamforming, the controller 202 may selectively (i) delay the transmission of the recorded audio from any one or more of the loudspeaker elements 103 in the loudspeaker array 102, (ii) play the recorded audio from any one or more of the loudspeaker elements 103 in the loudspeaker array 102 at different volumes, and/or (iii) employ cancellation effects at the one or more loudspeaker elements 103. These different loudspeaker settings allow the loudspeaker array 102 to control the size, shape, and direction of the transmitted recorded audio output.

In operation 258, the controller 202 transmits the recorded audio output to the various loudspeaker elements 103 in the array 102 to provide the recorded audio output (or recorded announcement) to the vehicle 104.

Figure 5:
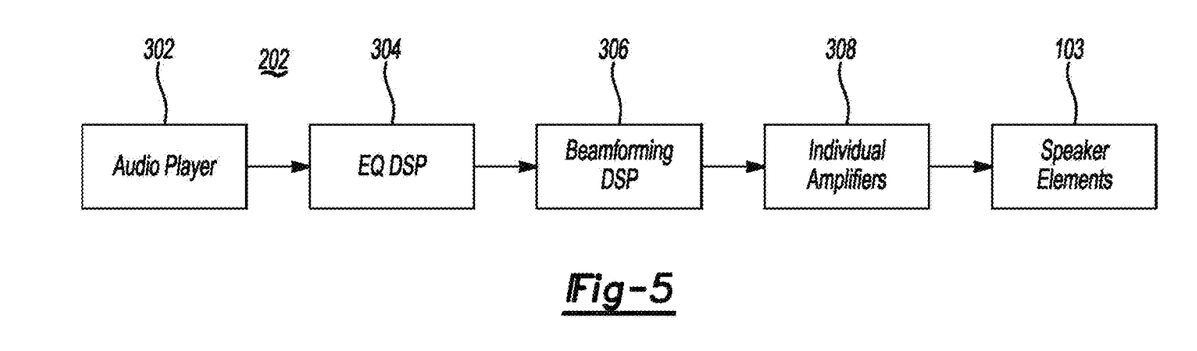
FIG. 5 generally depicts a block diagram for a controller of the loudspeaker array in accordance with one embodiment.

FIG. 5 generally depicts a block diagram 300 for the controller 202 of the loudspeaker array 102 in accordance with one embodiment. The controller 202 generally includes an audio player 302, an equalization digital signal processor (DSP) 304, a beamforming DSP 306, a plurality of amplifiers 308, and the loudspeaker elements 103). The audio player 302 receives the recorded message and provides a digital version of the recorded audio output to the equalization DSP 304. The equalization DSP 304 applies the equalization parameters to the audio output based on the measurements obtained from the vehicle(s) to obtain the average in-car noise characteristic. As noted above, the average in-car noise characteristic takes into account transmission loss attributed to the vehicle 104 and road and engine noise that may be experienced in the vehicle 104 This aspect increases the in-car intelligibility of the audio output when the audio output enters into a cabin of the vehicle 104.

The beamforming DSP 306 may selectively (i) delay the transmission of the recorded audio from any one or more of the loudspeaker elements 103 in the loudspeaker array 102, (ii) play the recorded audio from any one or more of the loudspeaker elements 103 in the loudspeaker array 102 at different volumes, and/or (iii) employ cancellation effects at the one or more loudspeaker elements 103. As noted above, these different loudspeaker settings allow the loudspeaker array 102 to control the size, shape, and direction of the transmitted recorded audio output. The individual amplifiers 308 may amplify various audio inputs that correspond to the recorded audio output based on control signals provided by the beamforming DSP 306. This aspect enables the system 300 to control the volume of the recorded audio output as played back by the individual loudspeaker elements 103.

Figure 6:
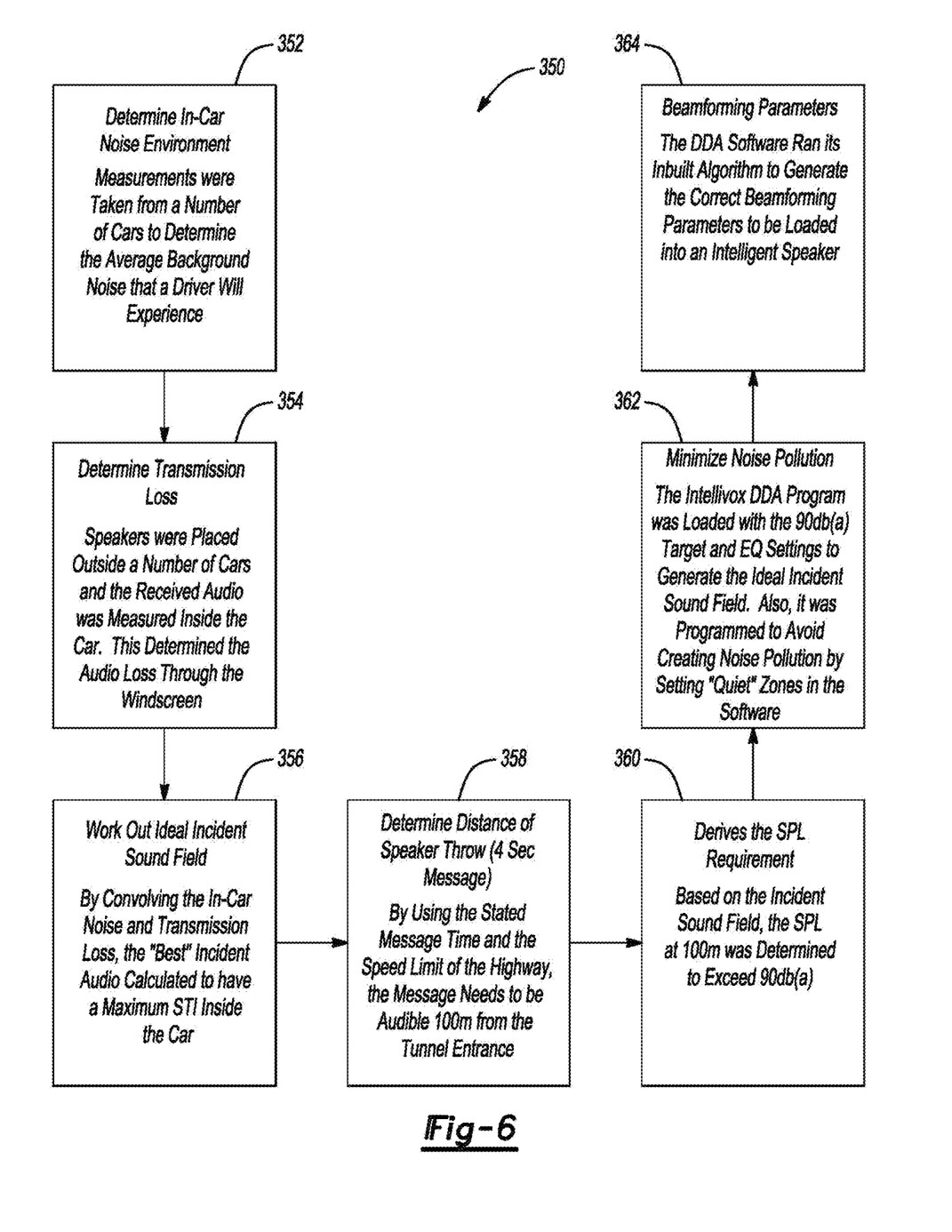
FIG. 6 generally depicts a process diagram for improving in-car speech intelligibility and reducing noise pollution as executed by a loudspeaker array of the road-alert system in accordance with one embodiment.

FIG. 6 generally depicts a process diagram 350 for improving in-car speech intelligibility and reducing noise pollution as executed by a loudspeaker array 102 of the road-alert system 100 in accordance with one embodiment.

At step 352, the in-car noise environment is measured at the vehicle 104. As noted above, measurements are performed at the car to assess road and engine noise that may be experience within the interior of the vehicle 104 or otherwise experienced by driver. The measurements may be performed from a number of vehicles to determine the average background noise that a driver will experience.

At step 354, the transmission loss is determined at the vehicle 104. For example, loudspeakers may be placed outside of a number of vehicles and the received audio may then be measured inside the vehicle 104. This step determines the audio loss that may occur through the windscreen and other aspects of the exterior shell of the vehicle 104.

At step 356, an ideal incident sound field may be determined. By convolving the in-car noise and transmission loss as determines in steps 352 and 354, respectively, the most ideal (or best) incident audio is ascertained to provide the maximum STI in the vehicle 104. By understanding the effective noise floor as noted above, it is then possible to calculate the frequency characteristics of the sound (e.g., warning) that is arriving at the vehicle 104 (or being heard by the driver of the vehicle 104) from the loudspeaker array 102.

For example, the original "untuned signal" from the loudspeaker array 102 is attenuated non-linearly by the vehicle's exterior (e.g., windshield, etc.), which results in a certain "Transmission Loss". This attenuated signal then needs to compete with the surrounding road/engine noise. To achieve high STI, the loudspeaker array 102 is required to meet a minimum signal-to-noise ratio (SNR) at every frequency band. Therefore, the equalization parameters of the loudspeaker array 102 needs to first correct the non-linear transmission loss, then increase gain in specific frequency bands to overcome noise (i.e., to meet the minimum SNR), and finally smooth the overall frequency response.

At step 358, a distance of the loudspeaker throw is determined. By using a message time of, for example, 4 seconds (or a four second message time) and the speed limit of the highway, a determination may be made that the message needs to be audible, for example, for 100 m from an entrance of the tunnel. For example, the speed limit of highways in Japan is 100 km/h. A short message may typically be about 4 seconds in length. This provides about 100 m of road traveled by the vehicle 104 as the vehicle 104 approaches the tunnel.

At step 360, based on an incident sound field, the SPL for the distance determined at step 358 is determined. The incident sound field is generally defined as the sound that arrives at the outside (or exterior) of the vehicle 104 (e.g., before the transmission loss or competition with the road noise). The incident sound field may be considered the sound that contacts the windscreen of the vehicle 104). Assuming that the distance of the vehicle 104 from the tunnel (or other obstacle) is 100 meters, the SPL may need to be 90 dB as a target.

At step 362, the noise pollution is minimized. For example, memory of the controller 202 may store the SPL (e.g., 90 dB) as determined at step 364 and equalization settings or parameters to generate an ideal incident sound field. In addition, the controller 202 may be programmed to avoid creating noise pollution by setting quiet zones for the software executed by the controller 202.

The disclosed loudspeaker array 102 differs from a traditional horn in two ways. First, by the length of the sound field. For example, to obtain a narrow angle such as the angle achieved with the loudspeaker array 102 which may be, for example, 5 degrees, the horn would need to be very long, which would be impractical. Second by the frequency response. Horn-type based loudspeakers generally do not yield an optimized frequency response. In this regard, it would not be possible to achieve the same STI ratings as provided by the disclosed loudspeaker array 102. As noted above, the controller 202 may generate a beam of audio by adjusting the individual phasing of each of the loudspeaker elements (or the plurality of loudspeakers 103) in the array 102 (using constructive and destructive interference). This aspect enables for the sound to be "steered" into a very tight beam from the loudspeaker array 102. Thus, in this regard, the energy is steered only on the road 106, and not into the surroundings.

At step 364, beamforming parameters are applied. For example, the controller 202 executes beamforming parameters to control the loudspeaker elements 103 of the loudspeaker array 102 to transmit the recorded message at a lower dispersion to the desired target (e.g., the vehicle 104).

Figure 7:
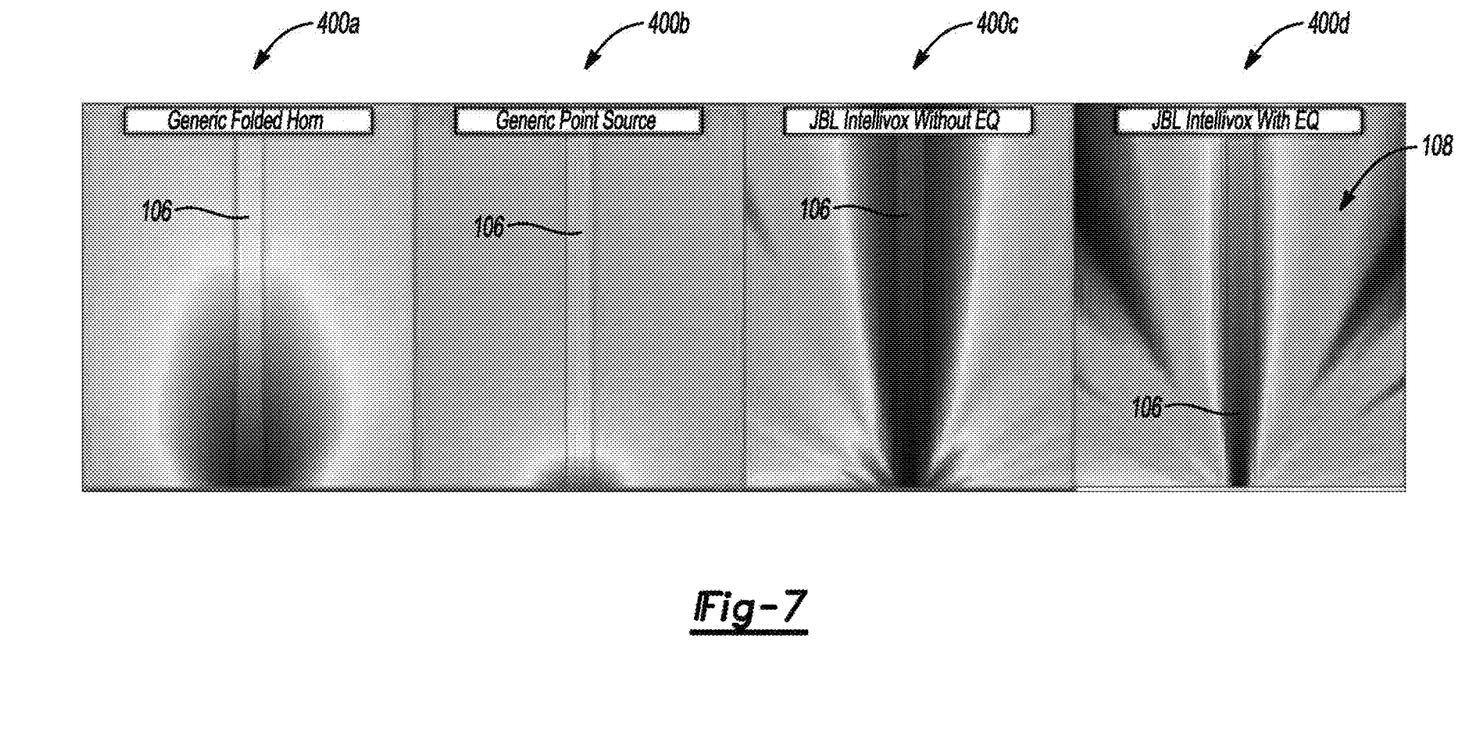
FIG. 7 generally depicts a plurality of sound pressure level "SPL" heat maps for various road alert systems.

FIG. 7 generally depicts a plurality of sound pressure level "SPL" heat maps 400a-400d for various road alert systems (or audio sources that provided a recorded message to the vehicle). A heat map for a generic folded horn is generally shown at 400a. The heat map 400a for the generic folded horn illustrates a wide dispersion of the audio output (or recorded message) as provided by the generic folded horn relative to the road 106. A heat map for a generic point source is generally shown at 400b. The heat map 400b for the generic point source illustrates a narrow dispersion of the audio output at a low amplitude or intensity. A point source loudspeaker may be approximated by a single sound source that radiates out in a predictable pattern such as loudspeaker in a home or a paging loudspeaker at a restaurant where the sound is originates from a "point".

The point source loudspeaker differs from the loudspeaker array 102 where all the loudspeaker elements 103 work together to from more of a cylindrical wavefront. Thus, instead of all the sound radiating from a "point", the sound radiates from a from a "line".

A heat map for one loudspeaker array is generally shown at 400c. The loudspeaker array may be implemented as a JBL Intellivox® array and does not include the equalization and beamformer characteristics. The heat map 400c for the JBL Intellivox® array illustrates a medium dispersion of the audio output at a very strong amplitude. While the dispersion of the audio output from the JBL Intellivox® array may be narrower than that illustrated with respect to the folded horn as shown at 400a, the dispersion of the audio output from the can be seen to overlap over the road 106 and extend onto portions of land adjacent to the road 106.

A heat map for the loudspeaker array 102 that employs equalization parameters and beamforming is generally shown at 400d. The heat map 400d for the loudspeaker array 102 illustrates a narrow dispersion of the audio output in comparison to that illustrated for the folded horn at 400a and the JBL Intellivox® array at 400c that does not include the equalization parameters or the beamforming. This condition minimizes the amount of noise pollution that may be disbursed in the environment 108. In addition, the loudspeaker array 102 exhibits an adequate level of amplitude for the audio output on the road 106.

Figure 8:
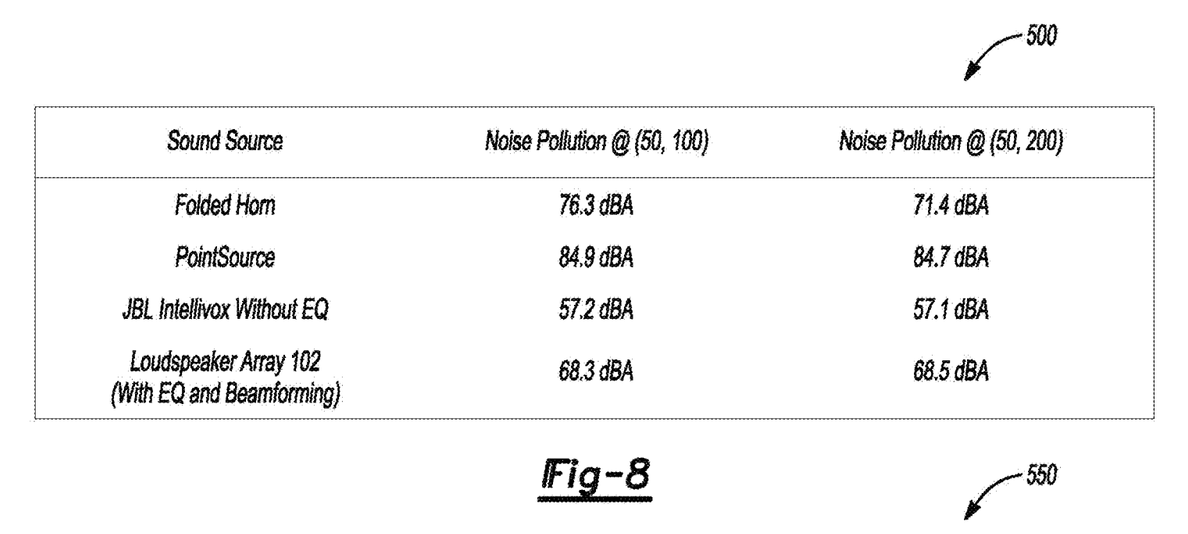
FIG. 8 generally depicts a table that illustrates noise pollution relative to various road alert systems.

FIG. 8 generally depicts a table 500 that illustrates noise pollution relative to various audio sources (e.g., folded horn, point source, JBL Intellivox Array® without equalization and beamforming capability, and the loudspeaker array 102 that incorporates equalization parameters and beamforming). As shown, the point source provides a high noise pollution at roughly 85.0 dBA. The JBL Intellivox array without equalization and beamforming generally exhibits the lowest noise pollution from out of the audio sources.

An aspect to take into account is the difference between the SPL on the road 106 and the SPL at the at least one residence and/or at least one commercial business 110. In order to be audible, the message needs to reach the car at about 96 dB//SPL. Due to the beam steering and the equalization parameters, the loudspeaker array 102 may achieve 96 dB on the road 106 while only having about 70 dB(a) outside or off of the road. The loudspeaker elements 103 provides a warning that may reach 96 dB//SPL on the road 106 the volume (or additional loudspeaker elements 103 are added). However, since the noise pollution may scale with the volume on the road 106, this may entail that there is more noise pollution in order to provide the warning or message across. Also, since the point source/folded horn speakers "drop off" quickly, a level of 96 dB at the 100 m point entails that the level near the tunnel entrance may be much higher. However, the loudspeaker array 102 can be steered via beamforming, the loudspeaker array 102 may have a consistent volume the entire way that the warning travels towards the tunnel.

Figure 9:
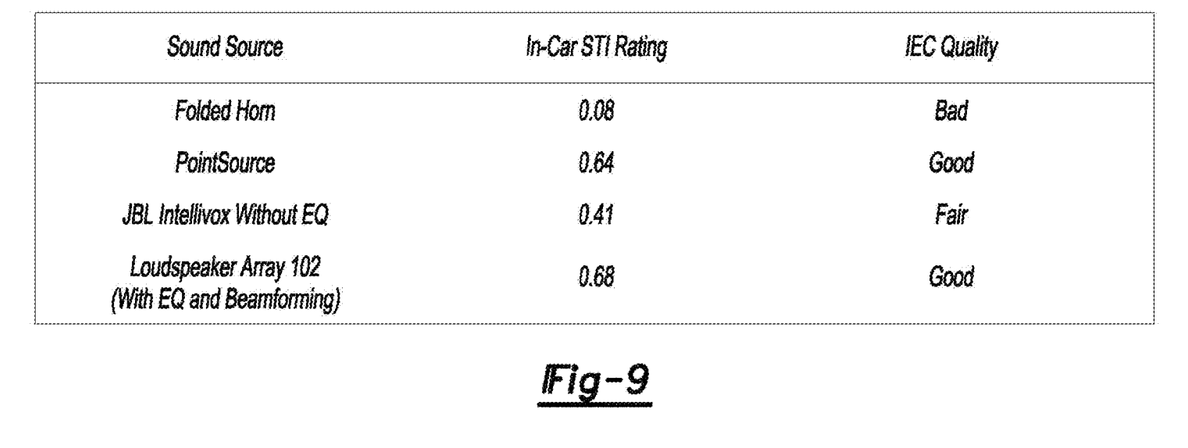
FIG. 9 generally depicts a table that illustrates an in-car Speech Transmission Index (STI) rating and IEC quality factor for various road alert systems.

FIG. 9 generally depicts a table that illustrates an in-car Speech Transmission Index (STI) rating and IEC quality factor for the audio sources (e.g., folded horn, point source, JBL Intellivox Array® without equalization and beamforming capability, and the loudspeaker array 102 that incorporates equalization parameters and beamforming). The folded horn speaker exhibits extremely poor in-car STI rating. The point source achieves favorable in-car STI rating at the expense of high noise pollution (e.g., see FIG. 8). The JBL Intellivox Array® without equalization and beamforming capabilities exhibits a very low SPL due to lack of headroom which compromises the in-car STI rating. The loudspeaker array 102 with equalization and beamforming capabilities exhibits the highest in-car STI rating and also provides approximately 17-20 dB lower noise pollution compared to the generic point source (e.g., see Table 500) which is the only other audio source with a comparable in-car STI rating. The JBL Intellivox Array® without equalization and beamforming capabilities outputs frequencies that are redundant to STI. Therefore, the input wattage is being distributed over a large range of frequencies which provides the limited SPL. Conversely, the loudspeaker array 102 with the equalization and beamforming capabilities provides frequencies that are essential for STI. Thus, given the same input wattage, the power is focused onto these essential frequencies thereby providing more STI.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A road alert system, the system comprising:
   a loudspeaker array for transmitting an audio output signal to a vehicle traveling on a road; and
   at least one controller programmed to:
      receive a message indicative of a warning for the vehicle for transmission on the audio output signal;
      apply equalization parameters to the message to increase in-vehicle speech intelligibility of the audio output signal within the vehicle; and
      transmit the audio output signal via the loudspeaker array in a beamforming mode to minimize noise pollution for objects positioned along the road,
   wherein the equalization parameters are based on at least measured vehicle noise from a plurality of vehicles and an average transmission loss characteristic as established from the plurality of vehicles.

2. The system of claim 1, wherein the at least one controller is further programmed to apply the equalization parameters to the message prior to transmitting the audio output signal in the beamforming mode.

3. The system of claim 1, wherein the average transmission loss characteristic is based on transmission losses for each vehicle attributed to at least an exterior shell for each of the vehicles.

4. The system of claim 1, wherein the measured vehicle noise is based on environmental noise exhibited on each of the plurality of vehicles.

5. The system of claim 1, wherein the at least one controller is further programmed to control at least one of a size, shape, and direction of the transmitted audio output signal in the beamforming mode.

6. The system of claim 1, wherein the at least one controller is further programmed to at least one of: (i) delay transmission of the audio output signal from any one or more loudspeakers positioned in the loudspeaker array, (ii) playback the audio output signal at one or more different volumes through the loudspeakers array, or (iii) employ cancellation effects at the one or more loudspeakers of the loudspeaker array while transmitting the audio output signal.

7. A method for transmitting an alert to a vehicle on a road, the method comprising:
   transmitting, via a loudspeaker array, an audio output signal to a vehicle traveling on the road; and
   receiving, at at least one controller, a message indicative of a warning for the vehicle for transmission on the audio output signal;
   applying equalization parameters to the message to increase in-vehicle speech intelligibility of the audio output signal within the vehicle; and
   transmitting the audio output signal via the loudspeaker array in a beamforming mode to minimize noise pollution for objects positioned along the road,
   wherein the equalization parameters are based on at least measured vehicle noise from a plurality of vehicles and an average transmission loss characteristic as established from the plurality of vehicles.

8. The method of claim 7, wherein applying the equalization parameters to the message is performed prior to transmitting the audio output signal in the beamforming mode.

9. The method of claim 7, wherein the average transmission loss characteristic is based on transmission losses for each vehicle attributed to at least an exterior shell for each of the vehicles.

10. The method of claim 7, wherein the measured vehicle noise is based on environmental noise exhibited on each of the plurality of vehicles.

11. The method of claim 7, wherein transmitting the audio output signal via the loudspeaker array in the beamforming mode further includes controlling at least one of a size, shape, and direction of the transmitted audio output signal.

12. The method of claim 7, wherein transmitting the audio output signal via the loudspeaker array in the beamforming mode further includes controlling at least one of: (i) a delay transmission of the audio output signal from any one or more loudspeakers positioned in the loudspeaker array, (ii) the playback of the audio output signal at one or more different volumes through the loudspeakers array, or (iii) employ cancellation effects at the one or more loudspeakers of the loudspeaker array while transmitting the audio output signal.

13. A computer-program product embodied in a non-transitory computer readable medium that is programmed and executable by at least one controller for transmitting an alert to a vehicle on a road, the computer-program product comprising instructions for:
   transmitting, via a loudspeaker array, an audio output signal to a vehicle traveling on the road; and
   receiving, at at least one controller, a message indicative of a warning for the vehicle for transmission on the audio output signal;

applying equalization parameters to the message to increase in-vehicle speech intelligibility of the audio output signal within the vehicle; and transmitting the audio output signal via the loudspeaker array in a beamforming mode to minimize noise pollution for objects positioned along the road, wherein the equalization parameters are based on at least measured vehicle noise from a plurality of vehicles and an average transmission loss characteristic as established from the plurality of vehicles.

14. The computer-program product of claim 13, wherein applying the equalization parameters to the message is performed prior to transmitting the audio output signal in the beamforming mode.

15. The computer-program product of claim 13, wherein the average transmission loss characteristic is based on transmission losses for each vehicle attributed to at least an exterior shell for each of the vehicles.

16. The computer-program product of claim 13, wherein the measured vehicle noise is based on environmental noise exhibited on each of the plurality of vehicles.

17. The computer-program product of claim 13, wherein transmitting the audio output signal via the loudspeaker array in the beamforming mode further includes controlling at least one of: (i) a delay transmission of the audio output signal from any one or more loudspeakers positioned in the loudspeaker array, (ii) the playback of the audio output signal at one or more different volumes through the loudspeakers array, or (iii) employ cancellation effects at the one or more loudspeakers of the loudspeaker array while transmitting the audio output signal.

* * * * *